United States Patent Office 3,423,347
Patented Jan. 21, 1969

3,423,347
COMPOSITIONS CONTAINING A THERMO-
PLASTIC RESIN AND A TETRAESTER OF
PENTAERYTHRITOL
Thomas Zawadzki, Princeton, and Algirdas A. Reventas, Rockaway, N.J., and Richard M. Lee, deceased, late of Leominster, Mass., by Mary G. Lee, executrix, Leominster, Mass., and Tonnie A. Hoyle, executor, Baton Rouge, La., assignors to The Borden Company, New York, N.Y., a corporation of New Jersey
No Drawing. Continuation of application Ser. No. 177,973, Mar. 7, 1962. This application Aug. 18, 1965, Ser. No. 481,158
U.S. Cl. 260—28.5                       1 Claim
Int. Cl. C08f 45/38, 29/24

ABSTRACT OF THE DISCLOSURE

This invention relates to sound records comprising a polymeric thermoplastic resin of aliphatic nature and a flow promoter consisting essentially of a tetraester of pentaerythritol with a monocarboxylic acid.

---

This application is a continuation of Ser. No. 177,973 filed Mar. 7, 1962 and now abandoned.

This invention relates to a thermoplastic composition containing a special flow promoter.

In making disk shaped phonograph records, for which the composition is particularly suited, it is customary to include a promoter of flow of the composition during pressing in hot condition to the thickness and shape desired.

Our copending application Ser. No. 99,071 filed Mar. 29, 1961, describes the problems involved in making such disks with carnauba wax, the conventional promoter of flow of the resin, with variations of quality of this natural wax from lot to lot. The said application continues with a description of a synthetic replacement of dependable uniformity of quality. The replacement used is the ester of a mononuclear aromatic acid having 3-6 carboxy groups, such as pyromellitic acid, with a monohydric $C_{10}$–$C_{12}$ aliphatic alcohol.

The present invention provides plastic for sound records of the same type in which the flow promoter is much lower in unit cost and satisfactory in milling characteristics when used in amounts giving greater flow than obtained with permissible proportions of the said ester or carnauba wax.

Briefly stated the invention comprises a plastic of polyvinyl chloride or the like and the ester of pentaerythritol with a higher fatty acid such as stearic as the flow promoter.

As to materials, the composition is any one that is conventional for a phonograph record except that the promoter of flow of the resin therein is the pentaerythritol higher fatty acid ester.

Ordinarily the base material, i.e., the component of highest proportion such as half or more of the total is any thermoplastic polymeric resin that is conventionally used as the base for sound records. Examples are a polyvinyl ester in which vinyl chloride is the monomer represented in largest proportion in the resin. Examples of resins that meet the requirements and illustrate the class to be used are polyvinyl chloride (PVC) and copolymers or interpolymers of vinyl chloride (VC) with one or more of the following ethenoid monomers in the proportion of about 2%–20% of the total weight of the copolymer: vinyl acetate (VAC), and vinyl esters of monobasic aliphatic acids having 2–20 carbon atoms to the molecule. Other resins that may be used are polymers of $C_1$–$C_4$ alkyl esters of acrylic and methacrylic acids; and polystyrenes.

More specific examples that illustrate the resins to be used in the record compositions are (1) vinyl chloride homopolymer having a specific viscosity of 0.4–2, as determined by the equation:

Specific viscosity =
$$\frac{\text{solution viscosity} - \text{solvent viscosity}}{\text{solvent viscosity}}$$

wherein the solution viscosity refers to the viscosity of a 1% by weight solution of the resin in cyclohexanone at 25° C. and the solvent viscosity refers to the viscosity of cyclohexanone at 25° C.; (2) a copolymer of vinyl chloride with vinyl acetate having a specific viscosity by the same test of 0.4–2.0 and having therein 2 to 20 parts of vinyl acetate and suitably 8–16 parts for 100 parts total weight of said copolymer; and (3) polystyrene having a number average molecular weight of 50,000–250,000.

It is customary to use an organic extender in the record composition. The extender selected here is any that is in commercial use for this purpose in record manufacture. It must be a solid at room temperature such as 70° F. but fusible at compounding temperatures as low as 250° F. and compatible with the selected resin or resin mixture at all temperatures between the lowest winter temperature at which the record may be stored up to the maximum temperature of compounding as, for instance, within the range −40°–400° F. Examples of such extenders that we can use are paraffin wax chlorinated to the extent of making it compatible as stated and substantially non-volatile at temperatures up to and including 300° F., e.g., Chlorowax 70, a chlorinated paraffin wax of chlorine content approximately 70% and melting point about 195°–212° F. The extender is insoluble in water but soluble in hydrocarbon liquids and in thermoplastic resins of the class illustrated above. Other extenders that we can use are solid coal tar and petroleum hydrocarbons, various thermoplastic condensation resins of formaldehyde with by-product lignin or the like containing phenolic groups from the sugar and paper industries, and cumarone indene resins.

Other conventional materials may be used for their usual effects. Among these are the stabilizers for the vinyl resins as, for example, the metal salts such as barium, cadmium and zinc salts of any $C_{12}$–$C_{18}$ monocarboxylic aliphatic acid such as lauric or stearic, alkyl phenols such as nonyl phenols, and mixtures of triphenyl phosphite with the metal salts of kind described. Specific stabilizers that we use, either alone or mixed with each other, are barium or cadium laurate, dibasic lead stearate (DS 207), and tribasic lead fumarate (Lectro 78). Stabilizers are ordinarily not used wtih the polyvinyl benzene (polystyrene), although they may be compounded therewith, e.g., di-tert. butyl catechol or 2,6-di-tert. butyl-p-cresol.

The flow promoter is an ester of pentaerythritol with any $C_{12}$–$C_{26}$ monocarboxylic aliphatic acid of melting point about 10°–90° C. Examples of the acid that illustrate the class to be used are lauric, palmitic, stearic, oleic and ricinoleic.

The ester selected as the flow promoter, if not available commercially, is prepared either by a method described in the literature for compounds of the class to be made or as follows:

There is first made the ethyl ester of the selected acid. The ethyl ester is then converted, by ester interchange, to the corresponding ester of the higher alcohol which is desired for use as the actual flow promoter, all by usual technique. Thus there are mixed the selected fatty acid with at least an equivalent proportion of ethanol. In the resulting solution there is then introduced toluene sulfonic acid or sulfuric acid in the amount of approximately 1% of the combined weight of the aliphatic acid used. There is next introduced benzene in amount approximately half that of the ethanol. The whole is then warmed to refluxing under a good fractionating column. The fractioned vapors are condensed in a down condenser which delivers the resulting condensate to a water separator of conventional type. The water formed in the esterification collects in the bottom of the separator and can be drawn off. The upper layer, high in benzene content, is returned to the reaction mass. When no further water comes over or when test of the reacting mass shows the acidity to have fallen to a low level and to remain substantially constant, then the fractionation is discontinued.

6, 7 and 8 with compositions containing no flow promoter (1), carnauba wax (2, 3) and tetrastearyl pyromellitate (4, 5) as flow promoters, these compositions not being examples of the present invention.

The components of kind and in amount shown were mixed on a laboratory two-roll mill, of roller sizes 6 inches diameter and 12 inches long, for 5 minutes at 265° F. To determine the flow characteristics, 1.6 gram samples of the different compositions were pressed between rigid plates for 15 seconds at 1,250 p.s.i. and at 250° F. for the first test reported and at 300° F. for the later one. The diameter of the pressed disks in cm. is reported as the "Flow" of the record composition.

| | Parts by Weight | | | | | | | |
|---|---|---|---|---|---|---|---|---|
| | 1 | 2 | 3 | 4 | 5 | 6 | 7 | 8 |
| Component Used: | | | | | | | | |
|   VC 85–VAC 15 copolymer [1] | 48.5 | 48 | 47.5 | 48 | 47.5 | 48 | 47.5 | 46.5 |
|   PVC (sp. visc. 0.62) | 30 | 30 | 30 | 30 | 30 | 30 | 30 | 30 |
|   Chlorowax 70, extender | 20 | 20 | 20 | 20 | 20 | 20 | 20 | 20 |
|   Lectro 78, stabilizer | 1.0 | 1.0 | 1.0 | 1.0 | 1.0 | 1.0 | 1.0 | 1.0 |
|   DS 207, stabilizer | 0.5 | 0.5 | 0.5 | 0.5 | 0.5 | 0.5 | 0.5 | 0.5 |
|   Carnauba wax, flow prom | | 0.5 | 1.0 | | | | | |
|   TSPM,[2] flow prom | | | | 0.5 | 1.0 | | | |
|   PE tetrastearate, flow prom | | | | | | 0.5 | 1.0 | 2.0 |
| Milling Characteristics | Sticky | OK | ([3]) | OK | ([3]) | OK | OK | ([3]) |
| Flow, cm.: | | | | | | | | |
|   250° F | 5.30 | 5.85 | 6.45 | 5.85 | 6.45 | 5.90 | 6.55 | 7.30 |
|   300° F | 6.80 | 7.00 | 7.55 | 6.90 | 7.60 | 6.90 | 7.45 | 9.00 |

[1] Specific viscosity 0.56.    [2] TSPM=tetrastearyl pyromellitate.    [3] Slightly over-lubricated.

The pentaerythritol (PE) whose ester is sought is then introduced in amount equivalent to the aliphatic acid used. The whole is then distilled at atmospheric pressure to expel the benzol, any excess of ethanol that remains, and ethanol replaced, in the ester first formed, by the pentaerythritol. The heating and distillation are continued until the lower alcohol is substantially replaced and distilled away.

The resulting pentaerythritol ester may be subjected to vacuum stripping to remove any remaining ethanol or benzene. Finally the PE ester is filtered hot to remove any insoluble material present. The resulting ester is then ready for use as flow promoter.

In the record composition, the proportion of the components of the several classes as well as their kind are conventional, with the exception of the kind and amount of flow promoter. Suitable proportions, however, are illustrated in the following table.

| Component Used | Parts for 100 Parts Total | |
|---|---|---|
| | Permissible | Recommended |
| Thermoplastic resin | 50–99 | 70–98 |
| Extender | 0–48 | 0–28 |
| Flow promoter (our PE ester) | 0.05–2 | 0.2–2 |
| Stabilizers and Pigments | Variable, as desired | |

The proportion of the flow promoter is ordinarily about 0.5–1.5 parts for 100 parts of the resin used. If adequate flow properties only are specified, then the proportion of the flow promoter may range as high as 10 parts. With the amounts of 2 parts or higher, however, we find that the composition is either lubricated to an unnecessary extent or over-lubricated as shown by the softness of stickiness on the mixing rolls or by the tests for penetrability or flexibility of the finished record. In any case, the amount of the ester to be incorporated as flow promoter is not in excess of the amount that can be compounded with the rest of the record composition, particularly with the polyvinyl esters therein, and remain compatible at temperatures as low as −40° F.

In the examples that follow and elsewhere herein, proportions are expressed as parts by weight unless specifically stated to the contrary.

EXAMPLE 1

The table shows proportions of the various materials and compares results of our invention in columns headed 6, 7 and 8 with compositions containing no flow promoter (1), carnauba wax (2, 3) and tetrastearyl pyromellitate (4, 5) as flow promoters, these compositions not being examples of the present invention.

The copolymer of the table was that of 85 parts vinyl chloride and 15 vinyl acetate.

It will be noted from the table that the pentaerythritol tetrastearate gives at least as good results as the tetrastearyl pyromellitate which requires the relatively expensive pyromellitic acid. Our tetrastearate ester gives better flow with the maximum proportion permissible for satisfactory milling characteristics than either of the other materials.

EXAMPLE 2

The procedure and composition of Example 1, tests 6, 7 and 8 of the table with the pentaerythritol tetrastearate as flow promoter, are used except that the copolymer of vinyl chloride and vinyl acetate was used in the amount of 78, 77.5 and 70 parts, respectively, and no polyvinyl chloride was used. The results are as satisfactory as those shown in the columns 4, 5 and 6 of the table. There is some loss in economy, however, in replacing the polyvinyl chloride by the somewhat more expensive copolymer.

EXAMPLE 3

The procedure and composition of Example 1, tests 4, 5 and 6 of the table, are used except that the copolymer of vinyl chloride and vinyl acetate was replaced by an equal weight of polyvinyl chloride making the total of the latter 78, 77.5 and 78 parts, respectively. The compositions so made are satisfactory plastics but the flow is *not* as satisfactory as the compositions 4, 5 and 6 for sound record compositions.

EXAMPLE 4

The procedure and composition of Example 1, column 6 of the table are used except that the pentaerythritol stearate there used is replaced by an equal proportion of pentaerythritol tetralaurate, tetrapalmitate and tetraoleate, used separately and in turn. The results are satisfactory.

EXAMPLE 5

The procedure and composition of Example 1, test No. 6, are used except that the Chlorowax 70 used as the extender in the record composition is replaced by equal weights of (1) a solid coal tar hydrocarbon (2) solid petroleum hydrocarbons such as monocrystalline wax, (3) thermoplastic condensation products of formaldehyde with lignin, and (4) cumarone indene resin, used separately and in turn.

EXAMPLE 6

The procedure and composition of Example 1, test No. 6, are used except that the Lectro 78 and DS 207 stabilizers are replaced by an equal weight of any of the other stabilizers disclosed herein, used separately and in turn.

EXAMPLE 7

The procedure and composition of Example 1, test No. 6, are used except that the vinyl chloride and vinyl acetate copolymer and the polyvinyl chloride there used are replaced by an equal weight of polystyrene.

The products made as described in Examples 5–7 are satisfactory in flow promotion for various molded plastic compositions. The combination of properties realized by the use of the compositions 6, 7 and 8 of Example 1 gives the milling characteristic flow, compatibility at temperatures of −40° to 400° F. and flow promotion that is particularly suitable for sound records.

The wide temperature range of compatibility of the pentaerythritol tetrastearate with the resin is especially significant. Lubricants, to function properly, are of limited compatibility with the resin to be lubricated. The PETS compositions, however, have not shown either over-lubricity during compounding or exudation ("spewing") of the PETS from the compounded product on aging.

It will be understood that it is intended to cover all changes and modifications of the examples of the invention herein chosen for the purpose of illustration which do not constitute departures from the spirit and scope of the invention.

We claim:
1. A composition for phonograph records comprising approximately 30 parts by weight of polyvinyl chloride, 48 parts of a copolymer of vinyl chloride with vinyl acetate in the proportions of about 2%–20% of the acetate on the weight of the copolymer, 20 parts of chlorinated paraffin wax of 70% chlorine content as an extender, a stabilizer for the polyvinyl chloride and the said copolymer, and a flow promoter consisting essentially of about 1 part of pentaerythritol tetrastearate.

References Cited

UNITED STATES PATENTS

| | | | |
|---|---|---|---|
| 2,485,592 | 10/1949 | Griess et al. | 260—31.6 |
| 2,572,798 | 10/1951 | Ayers | 106—37 |
| 2,613,152 | 10/1952 | Doyle et al. | 260—28.5 |
| 2,636,867 | 4/1953 | Humfeld | 260—28.5 |
| 2,636,869 | 4/1953 | De Tartas | 260—28.5 |
| 2,711,996 | 6/1955 | Hofrichter | 260—23 |
| 2,783,270 | 2/1957 | Polly et al. | 260—31.6 |
| 2,862,961 | 12/1958 | Goreau | 260—31.6 |
| 2,975,152 | 3/1961 | Hurwitz et al. | 260—31.6 |

FOREIGN PATENTS

| | | |
|---|---|---|
| 874,890 | 8/1942 | France. |

MORRIS LIEBMAN, *Primary Examiner.*

B. A. AMERNICK, *Assistant Examiner.*

U.S. Cl. X.R.

260—31.6, 23, 899, 829; 106—37